Patented Oct. 7, 1952

2,613,160

UNITED STATES PATENT OFFICE 2,613,160

POWDERED PIGMENT COMPOSITIONS

William T. Walton, Chicago, Ill., and Arthur B. Holton, Bay Village, Ohio, assignors to The Sherwin-Williams Company, Cleveland, Ohio, a corporation of Ohio No Drawing. Application March 29, 1950, Serial No. 152,766

16 Claims. (Cl. 106—218)

This invention relates to powdered pigment compositions, to methods for the preparation thereof, and to a new and improved method for the handling and application of pigments and vehicles therefor.

It is customary at the present time for the manufacturer to mix pigments directly with suitable vehicles in order to supply the user with a complete line of ready mixed paints, enamels, or lacquers, of different colors. With the usual pigments and vehicles the proper dispersion of the pigment in the vehicle ordinarily requires expert skill and apparatus which is not possessed by the average user. This procedure in the preparation and handling of paint and other pigmented vehicles has the disadvantages that a wide variety of paint compositions must be carried in stock over relatively long periods of time, and the total quantity or bulk of paint in storage is necessarily very large. The demand for some colors is naturally much greater than for others so that the colors for which there is little demand will stand on the shelves of the paint shop or in a warehouse over a considerably longer period of time than the others. As a result, the pigments tend to settle, skins tend to form on the surface of the paint, and special means must be provided in some cases to redisperse the pigments and to prevent the formation of such skins.

One of the objects of the present invention is to provide a new and improved system or procedure for the preparation and application of paints, enamels and other pigmented coating compositions wherein the handling and distribution of the compositions and the ingredients thereof are greatly facilitated.

Another object of the invention is to provide a new and improved plural component pigment composition comprising on the one hand a pigment preparation of a predetermined color adapted to be dispersed in a suitable vehicle, and, on the other hand, a pigmented vehicle in which the aforementioned pigment preparation can be dispersed by the ordinary user merely with hand stirring and without the necessity for employing special apparatus or equipment such as is used by paint manufacturers at the present time in order to disperse pigments in vehicles.

A further object of the invention is to provide a new and improved powdered pigment composition which is readily dispersible by hand stirring in suitable vehicles to produce paints, lacquers and other pigmented vehicles.

A more specific object of the invention is to provide new and improved powdered pigment-resin compositions which are readily dispersible in liquid vehicles, and are characterized by full color development merely by hand stirring within a relatively short time. Other objects of the invention will appear hereinafter.

In accordance with this invention, it has been found that by milling resins with pigments in certain predetermined proportions new and improved pigment compositions are obtained which, when reduced to a proper particle size, are dispersible in the ordinary type of paint, enamel or lacquer vehicle merely by hand stirring to produce substantially full color development within a relatively short time.

Heretofore resins have been mixed with pigments, but, in general, the ratio of resin to pigment has been rather small, usually on the order of about 2% to about 5%. The amounts used have been calculated to produce films on the pigment particles on the order of a monomolecular film, and one reason for keeping the amount of resin low has been the desire to treat the pigment in such a way that its tinting properties are not affected.

In the practice of this invention, it has been found that small amounts of resins applied to pigments actually defeat the purpose of the invention, but that by milling a resin with a pigment in predetermined relatively large proportions of resin to pigment, new and improved pigment-resin compositions are obtained which can be very readily dispersed in a suitable vehicle with excellent color development merely by hand stirring. The amount of resin required for optimum results will vary somewhat with different pigments, but with each type of pigment there is a determinable minimum amount of resin to pigment, below which the desired results are not obtained. The amount of resin required appears to be related to the surface area of the pigment, and based upon the results obtained with various pigments it is apparent that the amount of resin required is substantially greater than that required to produce a monomolecular film or coating of the resin on the pigment particles.

Verbyla, in U. S. 2,000,003 has disclosed a dispersion of a pigment in a resin, the product being in the form of lumps or small pieces. While such product is dispersible in paint systems, a relatively long period of agitation is requisite to hand or manual dispersion. The time factor is believed to confine use of the Verbyla system principally to factory application where power mixing equipment is available. In order to obtain the rapid dissolution characteristics essential to a color concentrate for home use and manual stirring, we have discovered that the proportion of pigment dispersed in the total pigment-resin combination must be correlated with the average or mean particle diameter and the specific gravity of the pigment, and further classification of the particle size of the pigment-in-resin product must be made, retaining the particles for use in color concentrates within a relatively narrow range of particle size. It is believed that the failure of the prior art to recognize these critical factors has been instrumental in retarding public acceptance of a dry powdered color concentrate for custom color mixing at home, and that the product disclosed, because it is rapidly dispersible by manual stirring overcomes the principal objection to prior solid color concentrates.

Pigments are classified herein in terms of particle size and specific gravity, that is, surface area per pound, as small, medium and large. Chrome Yellow and Chrome Green are examples in the first category, Iron Blue an example of the second category, and Lampblack and Monastral Blue are examples of the third category. In terms of particle size, the pigments in the first category have a particle size (diameter as measured by the photographic method of Green) within the range from 0.3 to 0.5 micron, in the second category from 0.2 to 0.3 micron, and in the third category from 0.08 to 0.2 micron. (See Table A, column 11.) The predetermined critical minimum weight ratio of resin to pigment in the powdered pigment composition, based upon total weight of resin and pigment, will vary from about 20% resin for pigments having surface and density characteristics in the first category to 65% for pigments in the third category, as will be more fully illustrated hereinafter in the examples.

It has also been found, in accordance with the invention, that the color development is affected by the particle size of the powdered resin-pigment composition even though the ratio of resin to pigment remains constant and that the best results are obtained within a predetermined range of resin-pigment particle size. Within said predetermined range of resin-pigment particle size the optimum color development is obtained in a minimum period of manual stirring. With the optimum predetermined preferred ratio of resin to pigment, the optimum particle size for maximum color development in a minimum period of time is about the same regardless of the type of pigment, as hereinafter shown in the examples.

Another important feature of the invention resides in the use of resins which may be characterized as high melting. High melting resins are preferred so that the granules of material remain discrete and do not stick or flow together under storage at normal temperatures, or even the highest temperatures under which the product might be stored. It will be understood that there may be some softening of the resin before the melting temperature is reached. The resin, however, must show no substantial softening at atmospheric temperatures, and preferably should not soften or start to melt at temperatures below 100° C. Resins melting around 130 degrees C. or higher (ball and ring method), are preferred, although it will be understood that resins having a somewhat lower melting may be used where storage conditions are not adverse. Thus, Velsicol AB11-4 (melting point 112.8-118.3 degrees C.) produces an entirely satisfactory product for most purposes, as hereinafter described. The resin employed for coating the pigment particles should be soluble in the liquid vehicle, in which the resin-pigment composition is to be dispersed.

To demonstrate the invention a series of test resin-pigment compositions were prepared. In each case a suitable resin and a pigment were milled together on a 2-roll rubber mill, one roll of which was heated by steam to a temperature which permitted easy milling (20 to 45 pounds gage), the other roll being cold. One roll rotated faster than the other. The resin-pigment ratio was changed in successive runs in steps of 10 units of percentage composition, except at the low-resin pigment ratios where difficulty was encountered in milling. In these regions the composition was altered more gradually. The resin-pigment composition adhered to the hot roll from which it was cut and re-milled from time to time. The milling was continued until a glossy chip, or mirror-like appearance, was obtained, thereby indicating that the pigment was coated with the resin since it no longer had a flat appearance.

The milled resin-pigment mixture was allowed to cool in a thin sheet, was then broken up manually and passed once through a micropulverizer to produce powdered resin-pigment compositions.

The colored pigments chosen were Toluidine Red, Monastral Blue, Lampblack, Prussian Blue, Red Iron Oxide, Ferrite Yellow, Light Chrome Green, and Chrome Yellow. The resins used for coating each of these pigments in the manner previously described on a 2-roll rubber mill were a pentaerythritol ester of a rosin-maleic anhydride addition product sold under the name Pentalyn G, and a resinous hydrocarbon condensation product obtained by the polymerization of recycle stock derived as a by-product of oil cracking, the polymerization being effected by the Friedel-Crafts method in the presence of aluminum chloride sold under the name Velsicol AB11-4. Recycle stock is a petroleum fraction boiling within the range of about 200 degrees to about 450 degree F. comprising olefins and diolefins both straight chain and cyclic in nature and derived from the high temperature cracking of naphtha and gas oil fractions. The latter had a specific gravity within the range from 1.090 to 1.120; a melting point of 235 degrees F. to 245 degrees F. by the ball and ring method; an iodine number of 65 to 90 by the Wijs method, an acid number of 5 or less; and a color of 4 (Barrett). Both resins were soluble in aliphatic petroleum solvents.

In testing the resin-pigment compositions, two white enamels were used and a predetermined weight of colored resin-pigment composition was added to a predetermined weight of each type of enamel in the manner previously described. Each enamel contained 1.75 pounds of rutile titanium dioxide (white pigment) per gallon of enamel. One of these enamels, referred to as enamel A, had an oleoresinous varnish as a vehicle in which the resin was a pentaerythritol ester of rosin and the oil was dehydrated castor oil, this varnish being 25 gallons in length, that is to say, it contained 25 gallons of oil per 100 pounds of resin, or approximately two pounds of oil per pound of resin.

The vehicle of the second enamel, referred to herein as enamel B, was an alkyd varnish which contained 21% phthalic anhydride and 29% of a vegetable oil composed of equal parts of linseed oil and alkali refined soya bean oil.

The various pigment-resin compositions prepared as previously described were added to 200 grams of each enamel in proportions such that the weight of colored pigment was the same in each test within a given series. Therefore, if the dispersion of the colored pigment was equal and the dispersibility of the pigment-resin dispersion was complete, the same tint was produced in each case.

The various pigment-resin dispersions were equally dispersible in the oleoresinous and the alkyd enamels. They dispersed slightly faster in the latter than in the former. Since the results were substantially similar with enamels A and B, it will be understood that in each of the following examples the tables given are applicable to both types of white enamel when employed in conjunction with the given colored pigment-resin composition.

The dispersibility of each series of powders was tested by stirring into a white enamel such weights of the powders as contained equal weights of pigment. Stirring was manual, but timed at approximately 120 strokes per minute. At the end of each minute, a few drops of the mixture were placed on a non-porous white paper, pressed and drawn down with a broad spatula. The dispersibility was deduced from the degree of streaking and tabulated.

At the end of 10 minutes stirring, the now pigmented enamel was brushed out on paper and a .005" film drawn down with a gage. The comparative depths of color in the brushed out and drawn down films gave a second criterion of dispersibility.

The results are shown in the following examples, in which the percentages are given in parts by weight. The first column in each table in the examples gives the time of stirring in minutes. Each succeeding column represents an evaluation of dispersibility or color development for different resin-pigment compositions at intervals of one minute to ten minutes from the time that the resin-pigment composition was added to the white enamels A and B.

EXAMPLE I

In this example the colored pigment was Toluidine Red and the resin was Velsicol AB11-4. The proportion of the resin-pigment composition added to white enamels A and B corresponded to 1.5 grams of colored pigment per 200 grams of each enamel.

The results obtained are illustrated in the following table:

*Table I*

| Percent Pigment | 10 | 20 | 30 | 40 | 50 | 60 | 70 |
|---|---|---|---|---|---|---|---|
| Percent Resin | 90 | 80 | 70 | 60 | 50 | 40 | 30 |
| 1 min | Poor | Poor | Poor | Poor | Poor | Poor | Poor |
| 2 min | Fair | Fair | Good | Fair | Fair | Poor | Poor |
| 3 min | Good | Good | Good | Good | Good | Poor | Poor |
| 4 min | O. K. | O. K. | O. K. | O. K. | O. K. | Poor | Poor |
| 5 min | O. K. | O. K. | O. K. | O. K. | O. K. | Poor | Poor |
| 6 min | O. K. | O. K. | O. K. | O. K. | O. K. | Poor | Poor |
| 7 min | O. K. | O. K. | O. K. | O. K. | O. K. | Poor | Poor |
| 8 min | O. K. | O. K. | O. K. | O. K. | O. K. | Poor | Poor |
| 9 min | O. K. | O. K. | O. K. | O. K. | O. K. | Poor | Poor |
| 10 min | O. K. | O. K. | O. K. | O. K. | O. K. | Poor | Poor |

As shown in this table the critical minimum ratio of resin to pigment with this particular pigment was 50% by weight of resin and 50% by weight of pigment. The optimum ratio appeared to be at 70% resin to 30% pigment. Poor results were obtained with 40% resin and 60% pigment, thus demonstrating that there is a critical minimum ratio of resin to pigment.

EXAMPLE II

In this example the colored pigment was Toluidine Red and the resin was Pentalyn G. The proportion if the resin-pigment composition added to white enamels A and B corresponded to 1.5 grams of colored pigment per 200 grams of each enamel.

The results obtained with compositions containing different ratios of resin to pigment are illustrated in the following table:

*Table II*

| Percent Pigment | 10 | 20 | 30 | 40 | 50 | 60 |
|---|---|---|---|---|---|---|
| Percent Resin | 90 | 80 | 70 | 60 | 50 | 40 |
| 1 min | | | | Poor | Poor | Poor |
| 2 min | | | | Fair | Fair | |
| 3 min | | | | Good | Fair | Fair |
| 4 min | O. K. | O. K. | O. K. | O. K. | O. K. | Fair |
| 5 min | O. K. | O. K. | O. K. | O. K. | O. K. | Good |
| 6 min | O. K. | O. K. | O. K. | O. K. | O. K. | O. K. |
| 7 min | O. K. | O. K. | O. K. | O. K. | O. K. | O. K. |
| 8 min | O. K. | O. K. | O. K. | O. K. | O. K. | O. K. |
| 9 min | O. K. | O. K. | O. K. | O. K. | O. K. | O. K. |
| 10 min | O. K. | O. K. | O. K. | O. K. | O. K. | O. K. |

EXAMPLE III

In this example the colored pigment was Chrome Yellow and the resin was Velsicol AB11-4. The proportion of the resin-pigment composition added to white enamels A and B corresponded to 3 grams of colored pigment per 200 grams of each enamel.

The results obtained with compositions containing different ratios of resin to pigment are illustrated in the following table:

*Table III*

| Percent Pigment | 10 | 20 | 30 | 40 | 50 | 60 | 70 | 80 |
|---|---|---|---|---|---|---|---|---|
| Percent Resin | 90 | 80 | 70 | 60 | 50 | 40 | 30 | 20 |
| 1 min | | | | | | | | Poor |
| 2 min | | | | | | | | Poor |
| 3 min | | O. K. | O. K. | O. K. | O. K. | O. K. | Poor | Poor |
| 4 min | | O. K. | O. K. | O. K. | O. K. | O. K. | Poor | Poor |
| 5 min | | O. K. | O. K. | O. K. | O. K. | O. K. | | Poor |
| 6 min | | O. K. | O. K. | O. K. | O. K. | O. K. | | Poor |
| 7 min | | O. K. | O. K. | O. K. | O. K. | O. K. | | Poor |
| 8 min | | O. K. | O. K. | O. K. | O. K. | O. K. | | Poor |
| 9 min | | O. K. | O. K. | O. K. | O. K. | O. K. | | Poor |
| 10 min | O. K. | O. K. | O. K. | O. K. | O. K. | O. K. | Good | Poor |

EXAMPLE IV

In this example the colored pigment was Prussian Blue and the resin was Velsicol AB11-4. The proportion of the resin-pigment composition added to white enamels A and B corresponded to 1 gram of colored pigment per 200 grams of each enamel.

The results obtained with compositions containing different ratios of resin to pigment are illustrated in the following table:

Table IV

| Percent Pigment | 10 | 20 | 30 | 40 | 50 | 60 |
|---|---|---|---|---|---|---|
| Percent Resin | 90 | 80 | 70 | 60 | 50 | 40 |
| 1 min | Poor | Poor | Poor | Poor | Poor | Poor |
| 2 min | Fair | Fair | Good | Fair | Fair | Poor |
| 3 min | Good | Good | O. K. | Good | Fair | Fair |
| 4 min | O. K. | O. K. | O. K. | O. K. | O. K. | Poor |
| 5 min | O. K. | O. K. | O. K. | O. K. | O. K. | Poor |
| 6 min | O. K. | O. K. | O. K. | O. K. | O. K. | Poor |
| 7 min | O. K. | O. K. | O. K. | O. K. | O. K. | Poor |
| 8 min | O. K. | O. K. | O. K. | O. K. | O. K. | Poor |
| 9 min | O. K. | O. K. | O. K. | O. K. | O. K. | Poor |
| 10 min | O. K. | O. K. | O. K. | O. K. | O. K. | Poor |

EXAMPLE V

In this example the colored pigment was Monastral Blue and the resin was Velsicol AB11-4. The proportion of the resin-pigment composition added to white enamels A and B corresponded to 1 gram of colored pigment per 200 grams of each enamel.

The results obtained with compositions containing different ratios of resin to pigment are illustrated in the following table:

Table V

| Percent Pigment | 10 | 20 | 30 |
|---|---|---|---|
| Percent Resin | 90 | 80 | 70 |
| 1 min | | | Poor |
| 2 min | | | Poor |
| 3 min | | | Poor |
| 4 min | | | Poor |
| 5 min | O. K. | Fair | Poor |
| 6 min | O. K. | | Poor |
| 7 min | O. K. | | Poor |
| 8 min | O. K. | | Poor |
| 9 min | O. K. | | Poor |
| 10 min | O. K. | O. K. | Poor |

EXAMPLE VI

In this example the colored pigment was Lampblack and the resin was Velsicol AB11-4. The proportion of the resin-pigment composition added to white enamels A and B corresponded to ½ gram of colored pigment per 200 grams of each enamel.

The results obtained with compositions containing different ratios of resin to pigment are illustrated in the following table:

Table VI

| Percent Pigment | 10 | 20 | 30 | 40 | 50 |
|---|---|---|---|---|---|
| Percent Resin | 90 | 80 | 70 | 60 | 50 |
| 1 min | | | | Poor | Poor |
| 2 min | | | | Poor | Poor |
| 3 min | | | | Poor | Poor |
| 4 min | | | | Poor | Poor |
| 5 min | Fair | Fair | Fair | Poor | Poor |
| 6 min | | | | Poor | Poor |
| 7 min | | | | Poor | Poor |
| 8 min | | | | Poor | Poor |
| 9 min | | | | Poor | Poor |
| 10 min | O. K. | O. K. | O. K. | Poor | Poor |

EXAMPLE VII

In this example the colored pigment was Light Chrome Green and the resin was Velsicol AB11-4. The proportion of the resin-pigment composition added to white enamels A and B corresponded to 2 grams of colored pigment per 200 grams of each enamel.

The results obtained with compositions containing different ratios of resin to pigment are illustrated in the following table:

Table VII

| Percent Pigment | 30 | 40 | 50 | 60 | 70 | 80 |
|---|---|---|---|---|---|---|
| Percent Resin | 70 | 60 | 50 | 40 | 30 | 20 |
| 1 min | Poor | Poor | Fair | Poor | Poor | Poor |
| 2 min | Fair | Fair | Good | Fair | Fair | Poor |
| 3 min | Fair | Good | O. K. | Good | Good | Poor |
| 4 min | O. K. | O. K. | O. K. | O. K. | O. K. | Poor |
| 5 min | O. K. | O. K. | O. K. | O. K. | O. K. | Fair |
| 6 min | O. K. | O. K. | O. K. | O. K. | O. K. | Fair |
| 7 min | O. K. | O. K. | O. K. | O. K. | O. K. | Fair |
| 8 min | O. K. | O. K. | O. K. | O. K. | O. K. | Fair |
| 9 min | O. K. | O. K. | O. K. | O. K. | O. K. | Fair |
| 10 min | O. K. | O. K. | O. K. | O. K. | O. K. | Fair |

EXAMPLE VIII

In this example the colored pigment was Ferrite Yellow and the resin was Velsicol AB11-4. The proportion of the resin-pigment composition added to white enamels A and B corresponded to 3 grams of colored pigment per 100 grams of each enamel.

The results obtained with compositions containing different ratios of resin to pigment are illustrated in the following table:

Table VIII

| Percent Pigment | 10 | 20 | 30 | 40 | 50 | 60 | 70 | 80 | 90 |
|---|---|---|---|---|---|---|---|---|---|
| Percent Resin | 90 | 80 | 70 | 60 | 50 | 40 | 30 | 20 | 10 |
| 1 min | | | | | | Poor | Poor | Poor | Poor |
| 2 min | | | | | | Poor | Poor | Poor | Poor |
| 3 min | | | | | | Fair | Poor | Poor | Poor |
| 4 min | | | | | | Fair | Poor | Poor | Poor |
| 5 min | O. K. | O. K. | O. K. | O. K. | O. K. | Fair | Poor | Poor | Poor |
| 6 min | O. K. | O. K. | O. K. | O. K. | O. K. | O. K. | Poor | Poor | Poor |
| 7 min | O. K. | O. K. | O. K. | O. K. | O. K. | O. K. | | Poor | Poor |
| 8 min | O. K. | O. K. | O. K. | O. K. | O. K. | O. K. | | Poor | Poor |
| 9 min | O. K. | O. K. | O. K. | O. K. | O. K. | O. K. | | Poor | Poor |
| 10 min | O. K. | O. K. | O. K. | O. K. | O. K. | O. K. | Fair | Poor | Poor |

EXAMPLE IX

In this example the colored pigment was Red Oxide and the resin was Pentalyn G. The proportion of the resin-pigment composition added to white enamels A and B corresponded to 1.5 grams of colored pigment per 200 grams of each enamel.

The results obtained with compositions containing different ratios of resin to pigment are illustrated in the following table:

Table IX

| Percent Pigment | 10 | 20 | 30 | 40 | 50 | 60 | 70 | 80 |
| Percent Resin | 90 | 80 | 70 | 60 | 50 | 40 | 30 | 20 |
|---|---|---|---|---|---|---|---|---|
| 1 min | Poor | Poor | Poor | Poor | Poor | Poor | Poor | Poor |
| 2 min | Fair | Poor | Poor | Fair | Fair | Fair | Poor | Poor |
| 3 min | Fair | Fair | Fair | Fair | Fair | O. K. | Fair | Fair |
| 4 min | Good | Good | O. K. | O. K. | O. K. | O. K. | Good | Fair |
| 5 min | O. K. | O. K. | O. K. | O. K. | O. K. | O. K. | O. K. | Good |
| 6 min | O. K. | O. K. | O. K. | O. K. | O. K. | O. K. | O. K. | Good |
| 7 min | O. K. | O. K. | O. K. | O. K. | O. K. | O. K. | O. K. | O. K. |
| 8 min | O. K. | O. K. | O. K. | O. K. | O. K. | O. K. | O. K. | O. K. |
| 9 min | O. K. | O. K. | O. K. | O. K. | O. K. | O. K. | O. K. | O. K. |
| 10 min | O. K. | O. K. | O. K. | O. K. | O. K. | O. K. | O. K. | O. K. |

EXAMPLE X

In this example the colored pigment was Monastral Blue and the resin was Pentalyn G. The proportion of the resin-pigment composition added to white enamels A and B corresponded to 1 gram of colored pigment per 200 grams of each enamel.

The results obtained with compositions containing different ratios of resin to pigment are illustrated in the following table:

Table X

| Percent Pigment | 10 | 20 | 25 |
| Percent Resin | 90 | 80 | 75 |
|---|---|---|---|
| 1 min | Poor | Poor | Poor |
| 2 min | Poor | Poor | Poor |
| 3 min | Fair | Fair | Poor |
| 4 min | Good | Good | Fair |
| 5 min | O. K. | O. K. | Fair |
| 6 min | O. K. | O. K. | Fair |
| 7 min | O. K. | O. K. | Good |
| 8 min | O. K. | O. K. | Good |
| 9 min | O. K. | O. K. | Good |
| 10 min | O. K. | O. K. | O. K. |

EXAMPLE XI

In this example the colored pigment was Lampblack and the resin was Pentalyn G. The proportion of the resin-pigment composition added to white enamels A and B corresponded to ½ gram of colored pigment per 200 grams of each enamel.

The results obtained with compositions containing different ratios of resin to pigment are illustrated in the following table:

Table XI

| Percent Pigment | 10 | 20 | 30 | 35 |
| Percent Resin | 90 | 80 | 70 | 65 |
|---|---|---|---|---|
| 1 min | | Poor | Poor | Poor |
| 2 min | | Fair | Fair | Poor |
| 3 min | | Fair | Good | Fair |
| 4 min | | Good | Good | Fair |
| 5 min | O. K. | O. K | O K | O. K. |
| 6 min | O. K. | O. K. | O. K. | O. K. |
| 7 min | O. K. | O. K. | O. K. | O. K. |
| 8 min | O. K. | O. K. | O. K. | O. K. |
| 9 min | O. K. | O. K. | O. K. | O. K. |
| 10 min | O. K. | O. K. | O. K. | O. K. |

EXAMPLE XII

In this example the colored pigment was Chrome Yellow and the resin was Pentalyn G. The proportion of the resin-pigment composition added to white enamels A and B corresponded to 3 grams of colored pigment per 200 grams of each enamel.

The results obtained with compositions containing different ratios of resin to pigment are illustrated in the following table:

Table XII

| Percent Pigment | 10 | 20 | 30 | 40 | 50 | 60 | 70 | 75 |
| Percent Resin | 90 | 80 | 70 | 60 | 50 | 40 | 30 | 25 |
|---|---|---|---|---|---|---|---|---|
| 1 min | | | | | Poor | Poor | Poor | Poor |
| 2 min | | | | | Fair | Fair | Fair | Poor |
| 3 min | | | | | Good | Fair | Fair | Fair |
| 4 min | O. K. | O. K. | O. K. | O. K. | O. K. | O. K. | O. K. | Good |
| 5 min | O. K. | O. K. | O. K. | O. K. | O. K. | O. K. | O. K. | Good |
| 6 min | O. K. | O. K. | O. K. | O. K. | O. K. | O. K. | O. K. | O. K. |
| 7 min | O. K. | O. K. | O. K. | O. K. | O. K. | O. K. | O. K. | O. K. |
| 8 min | O. K. | O. K. | O. K. | O. K. | O. K. | O. K. | O. K. | O. K. |
| 9 min | O. K. | O. K. | O. K. | O. K. | O. K. | O. K. | O. K. | O. K. |
| 10 min | O. K. | O. K. | O. K. | O. K. | O. K. | O. K. | O. K. | O. K. |

EXAMPLE XIII

In this example the colored pigment was Ferrite Yellow and the resin was Pentalyn G. The proportion of the resin-pigment composition added to white enamels A and B corresponded to 3 grams of colored pigment per 200 grams of each enamel.

The results obtained with compositions containing different ratios of resin to pigment are illustrated in the following table:

Table XIII

| Percent Pigment | 10 | 20 | 30 | 40 | 50 | 60 | 65 |
| Percent Resin | 90 | 80 | 70 | 60 | 50 | 40 | 35 |
|---|---|---|---|---|---|---|---|
| 1 min | | | | | Poor | Poor | Poor |
| 2 min | | | | | Poor | Poor | Poor |
| 3 min | | | | | Fair | Fair | Fair |
| 4 min | | | | | Good | Good | Good |
| 5 min | | | | | Good | O. K. | Good |
| 6 min | O. K. | O. K. | O. K. | O. K. | O. K. | O. K. | Good |
| 7 min | O. K. | O. K. | O. K. | O. K. | O. K. | O. K. | Good |
| 8 min | O. K. | O. K. | O. K. | O. K. | O. K. | O. K. | O. K. |
| 9 min | O. K. | O. K. | O. K. | O. K. | O. K. | O. K. | O. K. |
| 10 min | O. K. | O. K. | O. K. | O. K. | O. K. | O. K. | O. K. |

EXAMPLE XIV

In this example the colored pigment was Prussian Blue and the resin was Pentalyn G. The proportion of the resin-pigment composition added to white enamels A and B corresponded to 1 gram of colored pigment per 200 grams of each enamel.

The results obtained with compositions containing different ratios of resin to pigment are illustrated in the following table:

Table XIV

| Percent Pigment | 10 | 20 | 30 | 40 | 50 | 55 | 60 |
|---|---|---|---|---|---|---|---|
| Percent Resin | 90 | 80 | 70 | 60 | 50 | 45 | 40 |
| 1 min | | | | Poor | Poor | Poor | Poor |
| 2 min | | | | Poor | Poor | Poor | Poor |
| 3 min | | | | Fair | Fair | Poor | Poor |
| 4 min | | | | Good | Good | Poor | Poor |
| 5 min | O. K. | O. K. | O. K. | O. K. | O. K. | Poor | Poor |
| 6 min | O. K. | O. K. | O. K. | O. K. | O. K. | Fair | Poor |
| 7 min | O. K. | O. K. | O. K. | O. K. | O. K. | Good | Poor |
| 8 min | O. K. | O. K. | O. K. | O. K. | O. K. | Good | Poor |
| 9 min | O. K. | O. K. | O. K. | O. K. | O. K. | Good | Poor |
| 10 min | O. K. | O. K. | O. K. | O. K. | O. K. | Good | Poor |

EXAMPLE XV

In this example the colored pigment was Light Chrome Green and the resin was Pentalyn G. The proportion of the resin-pigment composition added to white enamels A and B corresponded to 2 grams of colored pigment per 200 grams of each enamel.

The results obtained with compositions containing different ratios of resin to pigment are illustrated in the following table:

Table XV

| Percent Pigment | 10 | 20 | 30 | 40 | 50 | 60 | 70 | 75 |
|---|---|---|---|---|---|---|---|---|
| Percent Resin | 90 | 80 | 70 | 60 | 50 | 40 | 30 | 25 |
| 1 min | | | | | | Poor | Poor | Poor |
| 2 min | | | | | | Poor | Poor | Fair |
| 3 min | | | | | | Fair | Poor | Fair |
| 4 min | | | | | | Fair | Fair | Good |
| 5 min | | | | | | Good | Good | O. K. |
| 6 min | O. K. | O. K. | O. K. | O. K. | O. K. | O. K. | O. K. | O. K. |
| 7 min | O. K. | O. K. | O. K. | O. K. | O. K. | O. K. | O. K. | O. K. |
| 8 min | O. K. | O. K. | O. K. | O. K. | O. K. | O. K. | O. K. | O. K. |
| 9 min | O. K. | O. K. | O. K. | O. K. | O. K. | O. K. | O. K. | O. K. |
| 10 min | O. K. | O. K. | O. K. | O. K. | O. K. | O. K. | O. K. | O. K. |

The approximate critical ratios of resin to pigment in the composite resin-pigment particles as illustrated by the foregoing examples are summarized briefly in the following table (Table A), which also gives the approximate particle size of the pigments employed in making the composite resin-pigment particles in the foregoing examples:

Table A

| | Particle Size of Pigments (Microns) by Photographic Methods | Critical Resin-Pigment Ratio | |
|---|---|---|---|
| | | Velsicol AB11-4 | Pentalyn G |
| Group I: | | | |
| Monastral Blue | .1–.2 | 8-9/2-1 | 8/2 |
| Lampblack | .08–.2 | 7/3 | 6. 5/3. 5 |
| Group II: | | | |
| Prussian Blue | .2 | 5/5 | 5/5 |
| Toluidine Red | .2–.3 | 5/5 | 4/5 |
| Ferrite Yellow | .25–.3 | 4-5/5-4 | 3. 5–4/6. 5–6 |
| Titanium Dioxide | 0.3 | | |
| Group III: | | | |
| Red Iron Oxide | .3–.45 | 3/7 | 2–3/8–7 |
| Chrome Green | .40–.45 | 3/7 | 2. 5–3/7. 5–7 |
| Chrome Yellow | 1 .4–.5 | 4/6 | 2. 5–3. 0/7. 5–7 |

[1] Friable, tendency to break to fine particles in grinding.

The following examples illustrate the effect of particle size of the pigment-resin compositions upon the results obtained. The resins were coated on the pigments in a 2-roll mill in the manner previously described, the cooled sheets were broken up then passed through a corn grinder which yielded a powder of wide particle size distribution. These particles were graded by shaking through a series of sieves into the mesh sizes indicated in the tables in the examples.

Samples of these graded particles were chosen as to contain equal weights of pigment and were stirred into white enamels A and B. The stirring, testing and the reading of results were carried out in the manner previously indicated. The results are tabulated for two pigments of very different chemical and physical characteristics.

EXAMPLE XVI

In this example the pigment Iron Red was coated with the resin Pentalyn G to give a powdered pigment-resin composition containing 40% resin and 60% pigment by weight of the total composition. This composition was then prepared in a variety of particle sizes in the manner previously described, and was mixed with white enamels A and B, each in the proportion of 1.5 grams of pigment per 200 grams of enamel, thereby producing a number of colored enamel samples which were tested for color development in the manner previously described, with the results illustrated in the following table:

Table XVI

| Pigment Mesh No. / Time | Over 20 | 20-30 | 30-40 | 40-50 | 50-60 | 60-80 | 80-100 | 100-120 | 120-140 | 140-200 | Under 200 |
|---|---|---|---|---|---|---|---|---|---|---|---|
| 1 min | | | | Poor | Poor | Poor | Poor | Poor | Fair | Poor | Poor |
| 2 min | | Poor | Poor | Poor | Poor | Poor | Fair | Fair | Good | Fair | Poor |
| 3 min | Poor | Poor | Poor | Fair | Fair | Good | Good | Good | Good | Good | Fair |
| 4 min | Poor | Poor | Poor | Fair | Good | Good | O. K. | | O. K. | Good | Good |
| 5 min | Poor | Poor | Fair | Good | Good | O. K. | O. K. | O. K. | O. K. | O. K. | Good |
| 6 min | Fair | Fair | Fair | O. K. | O. K. | O. K. | O. K. | O. K. | O. K. | O. K. | Good |
| 7 min | Fair | Fair | Fair | O. K. | O. K. | O. K. | O. K. | O. K. | O. K. | O. K. | Good |
| 8 min | Fair | Fair | Good | O. K. | O. K. | O. K. | O. K. | O. K. | O. K. | O. K. | O. K. |
| 9 min | Fair | Good | Good | O. K. | O. K. | O. K. | O. K. | O. K. | O. K. | O. K. | O. K. |
| 10 min | Fair | Good | Good | O. K. | O. K. | O. K. | O. K. | O. K. | O. K. | O. K. | O. K. |

As will be observed, the best color development was obtained within a certain range. Furthermore, within a predetermined range an optimum color development was obtained in a minimum period of time. On the other hand, as the particle size of the resin-pigment composition decreased beyond a certain point the color development also decreased.

EXAMPLE XVII

In a manner similar to that described in Example XVI, a pigment composition containing 80% Pentalyn G and 20% Monastral Blue was tested to determine the effect of particle size on color development and dispersibility characteristic using one gram of pigment per 200 grams of each of the white enamels A and B. The results are illustrated in the following table:

Table XVII

| Pigment Mesh No. / Time | Over 20 | 20-30 | 30-40 | 40-50 | 50-60 | 60-80 | 80-100 | 100-120 | 120-140 | 140-200 | Under 200 |
|---|---|---|---|---|---|---|---|---|---|---|---|
| 1 min | Poor | Poor | Poor | Poor | Poor | Fair | Fair | Fair | Fair | Fair | Fair |
| 2 min | Poor | Poor | Poor | Poor | Fair | Good | Good | Good | Good | Fair | Fair |
| 3 min | Poor | Poor | Poor | Poor | Good | O. K. | O. K. | Good | Good | Fair | Fair |
| 4 min | Poor | Poor | Poor | Fair | O. K. | O. K. | O. K. | O. K. | O. K. | Fair | Fair |
| 5 min | Poor | Poor | Fair | Good | O. K. | O. K. | O. K. | O. K. | O. K. | Good | Good |
| 6 min | Poor | Poor | Fair | Good | O. K. | O. K. | O. K. | O. K. | O. K. | Good | Good |
| 7 min | Poor | Fair | Good | O. K. | O. K. | O. K. | O. K. | O. K. | O. K. | Good | Good |
| 8 min | Poor | Fair | O. K. | O. K. | O. K. | O. K. | O. K. | O. K. | O. K. | Good | Good |
| 9 min | Poor | Fair | O. K. | O. K. | O. K. | O. K. | O. K. | O. K. | O. K. | Good | Good |
| 10 min | Poor | Fair | O. K. | O. K. | O. K. | O. K. | O. K. | O. K. | O. K. | O. K. | Good |

Again it was shown, as in Example XVI, that the particle size of the resin-pigment composition affected the results obtained within a range which could be predetermined. Also, it was observed that this range was approximately the same as that in Example XVI, the optimum results in each case being obtained with a composite resin-pigment having a particle size between 40 and 200 mesh, and preferably from about 50 to 140 mesh (calculated as square openings per square inch).

The following Table B summarizes the results of Examples XVI and XVII:

*Table B.—Particle size of composite resin-pigment particles required for full color development by manual stirring*

|  | 3 Min. | 4 Min. | 5 Min. |
|---|---|---|---|
| Pentalyn G-Red Iron Oxide | | 80-140 | 60-200 |
| Pentalyn G-Monastral Blue | 60-120 | 50-140 | 50-140 |

In the examples, where blank spaces occur in the tables no data were taken. In some of the tables, the ratios of resin to pigment below the predetermined critical minimum are not shown, but in each such instance these results are illustrated by other tables. Thus, in comparing Table XI with Table VI, it will be observed that although in Table XI the resin to pigment ratio was not carried below 65% to 35%, in Table VI the ratio was carried to a lower resin to pigment ratio with the same pigment and the color development began to drop sharply. In a similar manner, Table XV may be compared with Table VII. The results in the tables clearly illustrate that there is a predetermined minimum ratio of resin to pigment required for the purpose of the invention.

The expression "predetermined relatively large ratios of resin to pigment" refers to percentage ratios of the type described in this specification, taking into account the different types of pigments. In all cases these ratios are relatively large as compared with resin to pigment ratios that had been used before for most purposes. The required ratios, however, as already demonstrated, are greater with some types of pigment than with others. Thus, with pigments approximating the surface and density characteristics of Monastral Blue (Copper Phthalocyanine), the predetermined critical minimum ratio of resin to pigment approximates 65% resin to 35% pigment, and the optimum or preferred ratio approximates 85% resin to 15% pigment. With pigments approximating the surface and density characteristics of Iron Blue (Prussian Blue), the predetermined critical minimum ratio of resin to pigment is approximately 50% resin to 50% pigment, and the optimum or preferred ratio is about 70% resin to 30% pigment. With the heavier types of pigments approximating the physical characteristics of Chrome Green, the predetermined minimum ratio of resin to pigment approximates 20% to 25% resin to 75%–80% pigment, and the optimum or preferred ratio approximates 40% resin to 60% pigment. The maximum ratio of resin to pigment is limited largely by practical considerations and can be as high as 90% resin to 10% pigment, although in most instances the optimum results are obtained at a lower ratio of resin to pigment, and, therefore, it would be uneconomical to employ larger percentages of resin than those at which the optimum results are obtained.

The results given in the examples illustrate that the invention is applicable to all types of pigments. It is applicable not only to colored pigments, but also to white pigments. The white pigments can be employed in about the same manner as the colored pigments except that whereas the colored pigments require only several grams of pigment per gallon of coating composition, the white pigments may require as much as four pounds of pigment per gallon.

The invention is not limited to the use of any particular resin for coating the pigment particles. The resin should be one which will form a coating or film on the pigment particles; it should have a relatively high melting point so as to be substantially non-softening under conditions of storage and use; it should preferably be a film-forming resin which is preferably insoluble in water and soluble in aliphatic hydrocarbon solvents, and it must be soluble in the vehicle in which the powdered resin-pigment composition is to be dispersed. Excellent results have been obtained with the two types of resins given in the examples. Other illustrations of suitable resins are Congo ester and ester gum.

The invention is not limited to any particular manner or means for coating the discrete pigment particles with the resin. The method and apparatus described with respect to the examples gives very satisfactory results, but other methods and apparatus may be used.

The examples also illustrate the application of the invention to two of the principal types of vehicles employed in making pigmented coating compositions, namely, oleoresinous varnishes and alkyd resin vehicles. The invention is not limited to these two types of vehicles, but may also be employed with other liquid vehicles having suitable drying, film-forming and/or other qualities, depending upon the desired use of the product. Thus, to prepare a house paint the resin-pigment composition would be mixed with linseed oil or other type of oil suitable for this purpose; to prepare a flat wall or semi-gloss finish it would be mixed with an oleoresinous varnish; to prepare an automotive finish it would be mixed with an alkyd varnish; and to prepare a pigmented lacquer it would be mixed with a nitrocellulose or other lacquer of this type. Accordingly, the invention is applicable generally to the preparation of pigmented coating compositions.

The vehicle to which the powdered resin-pigment composition is added may be a clear vehicle or a pigmented vehicle. Excellent results are obtained in either case. The invention is particularly important, however, where the powdered resin-pigment composition is added to a pigmented vehicle such as a white enamel. In this manner the white enamel can be used as a base for any desired color. All it requires is the addition of the powdered resin-pigment composition which provides the color, the principal covering power being supplied by the base enamel.

The examples indicate that the desirable ratio of resin to pigment is somewhat dependent upon the resin employed. The use of different types of resins, however, does not substantially change the critical minimum ratios for the various types of pigments.

In the practice of the invention, auxiliary substances such as mica or other anti-bonding or anti-blocking agents can be added to the composite resin-pigment particles, preferably after they have been screened to size. These substances are adapted to prevent sticking, and in some cases the use of such substances will permit the use of resins having a somewhat lower melting point. Other examples of suitable anti-bonding agents are whiting, chalk, talc, starch and similar materials. The quantity employed should preferably be about 5% to 10% by weight of the composite pigment. Larger amounts are usually unnecessary and merely have a diluting effect. The preferred type of anti-bonding agent is a finely ground or micronized mica.

Dispersing and wetting agents may be incorporated with the composite resin-pigment particles but are not considered necessary.

The invention provides a new system or method for handling and preparing all types of pigmented coating compositions, including paints, enamels and lacquers. Instead of the pigment being incorporated into the vehicle by the manufacturer as is customary at present, the pigment and the vehicle are supplied separately as a plural component or multi-component product, the pigment being supplied in the form of a relatively small package of the powdered resin-pigment composition and the vehicle being supplied either as a clear base or a pigmented base vehicle, in which the resin of the powdered resin-pigment composition is soluble.

The powdered resin-pigment composition is free flowing, non-sticky, and disperses in the vehicle merely by hand stirring in a relatively short period of time, say from 2 to 10 minutes, the time varying somewhat depending upon the quantity being mixed. During this dispersion the resin of the powdered resin-pigment composition dissolves in the vehicle, liberating individual pigment particles which attain full color development. The invention provides compositions which produce the desired result with the minimum formation of agglomerated particles such as cause streaks when the resultant pigmented coating composition is applied. The fact that the use of a relatively large amount of resin in preparing the powdered resin-pigment composition contributes to these new and improved results is surprising, since a thin coating of resin on the pigment particles might be expected to produce a more rapid solution of resin, and hence a more rapid dispersion and color development of the pigment.

A further important advantage of the invention resides in the fact that no apparatus is required to disperse the powdered resin-pigment composition in the vehicle. The grinding methods heretofore employed for incorporating the pigment into the vehicle are replaced by simple hand or manual stirring. No expert handling is required because all that is necessary is to mix manually a package of the powdered pigment composition containing a predetermined quantity thereof with a predetermined quantity of the vehicle.

The invention makes it possible to reduce the amount of liquid vehicle required to be tied up in storage, especially on retail store shelves, as compared to present day requirements. It reduces the initial expense of the retailer in building up an inventory, it reduces the carrying charges, and greatly reduces storage space requirements, thereby resulting in an over-all saving to the consumer. The screen sizes given throughout the specification and claims refer to the United States Sieve series of the United States Bureau of Standards (1919) series.

This case as well as copending applications of U. S. Serial No. 152,764 and U. S. Serial No. 152,765 filed of even date are continuations-in-part as to common subject matter of U. S. Serial No. 573,314, filed January 17, 1945, now abandoned.

Having thus described the invention, what we claim as new and desire to secure by Letters Patent of the United States is:

1. A method of preparing a pigmented composition which comprises dispersing a colored pigment in a resin, the pigment characterized by an average particle diameter of from 0.3 to 0.5 micron, said resin friable at 20° C. but plastic at elevated temperatures and soluble in oleoresinous varnishes, dispersing said pigment in said resin while the resin is in a plastic state, and said pigment constituting at least 50% but not more than 80% by weight of the total pigment-in-resin mixture, thereafter cooling the pigment-resin dispersion to a temperature at which the resin is friable, and pulverizing, classifying and retaining the particles of the resultant color concentrate passing through a 40 mesh screen and withheld on a 200 mesh screen.

2. A granular color concentrate useful to change the coloration of a liquid paint system in a uniform manner through manual incorporation therein which comprises a pigmented resin, dry-powdered, the colored pigment characterized by an average particle diameter of from 0.3 to 0.5 micron, dispersed in a resin friable at 20° C. but plastic at elevated temperatures and soluble in oleoresinous varnishes, said pigment constituting at least 50% but not more than 80% by weight of the total pigment-in-resin dispersion, and said solid concentrate classified in particle size to pass through a 40 mesh screen and withheld on a 200 mesh screen.

3. A method of preparing a pigmented composition which comprises dispersing a pigment in a resin, the pigment selected from the group consisting of red iron oxides, chrome greens and chrome yellows, the resin friable at 20° C., plastic at elevated temperatures, and soluble in oleoresinous varnishes, dispersing said pigment in said resin while the resin is in a plastic state, said pigment constituting at least 50% but not more than 80% by weight of the total pigment-in-resin mixture, thereafter cooling the pigment-resin dispersion to a temperature at which the resin is friable, and pulverizing, classifying and retaining the particles of the resultant color concentrate passing through a 40 mesh screen and withheld on a 200 mesh screen.

4. A method of preparing a pigmented composition which comprises dispersing a pigment in a resin, the pigment selected from the group consisting of red iron oxides, chrome greens and chrome yellows, each of said pigments having an average particle diameter of from 0.3 to 0.5 micron, the resin friable at 20° C. but plastic at elevated temperatures and soluble in oleoresinous varnishes, dispersing said pigment in said resin while the resin is in a plastic state, said pigment constituting at least 50% but not more than 80% by weight of the total pigment-in-resin mixture, thereafter cooling said dispersion to a temperature at which the resin is friable and pulverizing, classifying and retaining the particles of the resultant color concentrate passing through a 40 mesh screen and withheld on a 200 mesh screen.

5. A method of preparing a pigmented composition which comprises dispersing a pigment in a resin, said pigment being a red iron oxide having an average particle diameter of from 0.3 to 0.5 micron, the resin friable at room temperature but plastic at elevated temperatures and soluble in oleoresinous varnishes, dispersing said pigment in said resin while the resin is in a plastic state and said pigment constituting at least 50% but not more than 80% by weight of the total pigment-in-resin mixture, thereafter cooling said dispersion to a temperature at which the resin is friable, and pulverizing, classifying and retaining the particles of the resultant color concentrate passing through a 40 mesh screen and withheld on a 200 mesh screen.

6. Same as claim 5, wherein the pigment is a chrome green.

7. Same as claim 5, wherein the pigment is a chrome yellow.

8. A method of preparing a pigmented composition which comprises dispersing a pigment in a resin, said pigment selected from the group consisting of red iron oxides, chrome greens and chrome yellows, each of said pigments having an average particle diameter of from 0.3 to 0.5 micron, said resin friable at 20° C. but plastic at elevated temperatures and soluble in oleoresinous varnishes, dispersing said pigment in said resin while the resin is in a plastic state and said pigment constituting at least 55% but not more than 65% by weight of the total pigment-in-resin mixure, thereafter cooling said pigment-resin dispersion to a temperature at which the resin is friable, and pulverizing, classifying and retaining the particles of the resultant color concentrate passing through a 50 mesh screen and withheld on a 140 mesh screen.

9. A method of preparing a pigmented composition which comprises dispersing a pigment in a resin, said pigment being a red iron oxide having an average particle diameter of from 0.3 to 0.5 micron, and said resin friable at 20° C. but plastic at elevated temperatures and soluble in oleoresinous varnishes, dispersing said pigment in said resin while the resin is in a plastic state, said pigment constituting at least 55% but not more than 65% by weight of the total pigment-in-resin mixure, thereafter cooling said pigment-resin dispersion to a temperature at which the resin is friable, and pulverizing, classifying and retaining the particles of the resultant color concentrate passing through a 50 mesh screen and withheld on a 140 mesh screen.

10. Same as claim 9, wherein the pigment is a chrome green.

11. Same as claim 9, wherein the pigment is a chrome yellow.

12. A granular color concentrate useful to change the coloration of a liquid paint system in a uniform manner through manual incorporation therein which comprises a pigmented resin, dry-powdered, the pigmentary portion selected from the group consisting of red iron oxides, chrome greens and chrome yellows, each of said pigments having an average particle diameter of from 0.3 to 0.5 micron, dispersed in a resin friable at 20° C. but plastic at elevated temperatures and soluble in oleoresinous varnishes, said pigment constituting at least 50% but not more than 80% by weight of the total pigment-in-resin dispersion, and said solid concentrate classified in particle size so as to completely pass through a 40 mesh screen and retained on a 200 mesh screen.

13. A granular color concentrate useful to change the coloration of a liquid paint system in a uniform manner through manual incorporation therein which comprises a pigmented resin, dry-powdered, the pigmentary portion selected from the group consisting of red iron oxides, chrome greens and chrome yellows, each of said pigments having an average particle diameter of from 0.3 to 0.5 micron, dispersed in a friable but thermoplastic resin soluble in oleoresinous varnishes, said pigment constituting at least 55% but not more than 65% by weight of the total pigment-in-resin dispersion, and said solid concentrate preferentially classified in particle size so as to completely pass through a 50 mesh screen and be retained on a 140 mesh screen.

14. A granular color concentrate useful to change the coloration of a liquid paint system in a uniform manner through manual incorporation therein which comprises a pigmented resin, dry-powdered, the pigmentary portion being a red iron oxide having an average particle diameter of from 0.3 to 0.5 micron, dispersed in a friable but thermoplastic resin soluble in oleoresinous varnishes, said pigment constituting at least 55% but not more than 65% by weight of the total pigment-in-resin dispersion and said solid concentrate preferentially classified in particle size so as to completely pass through a 50 mesh screen and retained on a 140 mesh screen.

15. Same as claim 14, wherein the pigment is a chrome green.

16. Same as claim 14, wherein the pigment is a chrome yellow.

WILLIAM T. WALTON.
ARTHUR B. HOLTON.

REFERENCES CITED

The following references are of record in the file of this patent:

UNITED STATES PATENTS

| Number | Name | Date |
| --- | --- | --- |
| 2,000,003 | Verbyla | Apr. 30, 1935 |
| 2,244,020 | Patton | June 3, 1941 |
| 2,379,237 | Jenkins | June 26, 1945 |